United States Patent
Iwakata et al.

(10) Patent No.: US 7,637,435 B2
(45) Date of Patent: Dec. 29, 2009

(54) IC TAG, READER/WRITER FOR THE IC TAG AND SYSTEM USING THE IC TAG

(75) Inventors: Yuichi Iwakata, Warabi (JP); Chisato Iino, Koshigaya (JP); Takehiko Nishikawa, Saitama (JP)

(73) Assignee: Lintec Corporation, Tokyo (JP)

( * ) Notice: Subject to any disclaimer, the term of this patent is extended or adjusted under 35 U.S.C. 154(b) by 219 days.

(21) Appl. No.: 11/509,470

(22) Filed: Aug. 24, 2006

(65) Prior Publication Data

US 2007/0063058 A1 Mar. 22, 2007

(30) Foreign Application Priority Data

Sep. 16, 2005 (JP) ............... 2005-270044

(51) Int. Cl.
*G06K 19/06* (2006.01)
(52) U.S. Cl. .................. 235/492; 235/487; 235/488
(58) Field of Classification Search .......... 235/380, 235/487, 488, 492, 493; 726/20
See application file for complete search history.

(56) References Cited

U.S. PATENT DOCUMENTS

| 5,521,371 | A | * | 5/1996 | Hotta et al. ............ 235/487 |
| 5,880,445 | A | * | 3/1999 | Mori et al. ............ 235/380 |
| 6,616,055 | B2 | * | 9/2003 | Okamura et al. ........... 235/492 |
| 6,956,010 | B2 | | 10/2005 | Tsukida et al. |
| 7,284,270 | B2 | * | 10/2007 | Kitamura et al. .............. 726/20 |
| 2004/0129788 | A1 | * | 7/2004 | Takahashi et al. ........... 235/492 |
| 2005/0197250 | A1 | | 9/2005 | Kawahara et al. |

FOREIGN PATENT DOCUMENTS

| EP | 1 571 005 A1 | 9/2005 |
| JP | 06-344672 A | 12/1994 |
| JP | 2003-118238 A | 4/2003 |
| JP | 2004-102432 A | 4/2004 |

OTHER PUBLICATIONS

The Patent Office of the People Repulbic of China, notification of first Office Action in 2006/10154217.3, issued Jul. 3, 2009 by Chinese Patent Office (Beijing China).

* cited by examiner

*Primary Examiner*—Kumiko C Koyama
(74) *Attorney, Agent, or Firm*—Frishauf, Holtz, Goodman & Chick, P.C.

(57) ABSTRACT

An IC tag has a layer of heat sensitive color developing material (I), a layer of material absorbing light and converting absorbed light into heat (II) and a protective layer (III) laminated on the surface of the support successively from the surface, or (II), (I) and (III) laminated on the surface of the support successively from the surface. This structure permits recording and erasing invisible information and recording and erasing visible information, both allowing recording and erasing information in a non-contact manner. The structure is flexible and can have a small size.

8 Claims, 2 Drawing Sheets

IC TAG, READER/WRITER FOR THE IC TAG AND SYSTEM USING THE IC TAG

BACKGROUND OF THE INVENTION

1. Field of the Invention

The present invention relates to an IC tag, a reader/writer for the IC tag and a system using the IC tag. More particularly, the present invention relates to an IC tag which has a means for recording and erasing invisible information and a means for recording and erasing visible information, both allowing recording and erasing information in a non-contact manner, exhibits flexibility and can have a small size, a reader/writer for an IC tag which can erase and record information in both of the means for recording and erasing invisible information and the means for recording and erasing visible information in the IC tag using the same apparatus in a non-contact manner, and a system using the IC tag which can be applied to logistics management.

2. Description of Related Art

As labels used for control of articles such as labels attached to plastic containers for transportation of foods (good-delivery boxes), labels used for control of electronic parts and labels for logistics management attached to cardboard boxes, heretofore, labels using a heat sensitive recording material (such as a direct thermal paper) as the surface substrate have been mainly used. In the heat sensitive recording material, a heat sensitive recording layer containing an electron-donating dye precursor which is, in general, colorless or lightly colored and an electron-accepting color developing agent as the main components is formed on a support. By heating the heat sensitive recording material by a heated head or a heated pen, the dye precursor and the color developing agent react instantaneously with each other, and a recording image can be obtained. Once the image is formed, it is impossible that the image in the heat sensitive recording material described above is erased to restore the condition before being treated for the image formation.

Heretofore, a heat sensitive recording material of the contact type described above is used as the surface substrate in the labels used for the logistics management of articles described above, and information such as the address, the name of the sender, the name of the article, the number of the article and the lot number or a bar code expressing the information is printed using a thermal printer of the contact type, and the obtained label is attached to the adherend. When the object assigned to the label is achieved, the label is manually removed so the adherend such as the container and the card board box can be utilized again, and great amounts of time and labor were required for the removal. To the adherend from which the label has been removed, another label printed by a thermal printer of the contact type is attached, and the adherend is used again.

As described above, it is the actual situation at present that a label is removed and another label is attached every time an adherent is reused. Therefore, a rewritable thermal label which can be repeatedly used for recording and erasing information while the label is not removed from the adherend in each reuse of the adherend but remains attached to the adherent is attracting attention. For example, a reversible heat sensitive recording material of the non-contact type having a means for recording and erasing visible information which is obtained by forming a heat sensitive color developing layer containing a dye precursor and a reversible color developing agent on a support is developed (for example, refer to Patent Reference 1). Although this reversible heat sensitive recording material of the non-contact type exhibits flexibility, the information which can be recorded depends on the size of the label, and the amount of the information is limited. For the reversible heat sensitive recording material of the non-contact type described above, in general, laser beam is used for recording information. For erasure of information, in general, laser beam and/or heat is used.

On the other hand, a tag using an IC for wireless communication having a rewritable memory device, which is called an IC tag, is attracting attention. In general, the IC tag has no source of electricity by itself, and the IC tag and a reading apparatus communicate with each other on demand by the reading apparatus.

The IC tag has electronic information at the inside of the tag attached to an "article" and has the function of identifying the information of the "article" by communication with the reading apparatus through radio wave. In comparison with conventional bar codes, the IC tag has the characteristics in that (1) the amount of information held by the IC tag is greater, (2) the tag can be recognized at a separated position (even when the tag is not seen directly), (3) many tags can be recognized simultaneously, and (4) an information in the tag can be replaced with another information, in some cases.

The IC tag described above can be utilized, for example, control at the place of production and in the stages of logistics, sales and recycling and disposal and for the logistics management.

An IC tag has, in general, a means for recording and erasing invisible information of the non-contact type constituted with an IC chip and an antenna circuit connected to the IC chip. An IC chip can be used more conveniently when the IC chip further has a means for recording and erasing visible information of the non-contact type. In this case, it is important that the functions as the tag, i.e., the flexibility and the small size, are not adversely affected.

A medium for display and recording having a means for digital information recording which records information and can rewrite the recorded information in a non-contact manner and a means for displaying information which displays information and can change the displayed information into another information in a non-contact manner, is disclosed (for example, refer to Patent Reference 2). In this medium for display and recording, the means for displaying information is constituted with a member for displaying information which is formed by laminating a display layer having the function of memory and a photoconductive layer comprising a photoconductive material between a pair of opposite electrodes at least one of which transmits light and a member for digital information recording which comprises, for example, an IC memory of the non-contact type. However, the above medium for display and recording is provided for use as a planar display and has a drawback in that the medium is inconvenient for use as a tag since the medium is rigid and poor in flexibility and has a great size due to great sizes of characters in the display portion.

[Patent Reference 1] Japanese Patent Application Laid-Open No. 2003-118238

[Patent Reference 2] Japanese Patent Application Laid-Open No. 2004-102432

BRIEF SUMMARY OF THE INVENTION

Under the above circumstances, the present invention has an object of providing an IC tag which has a means for recording and erasing invisible information and a means for recording and erasing visible information, both allowing recording and erasing information in a non-contact manner, exhibits flexibility and can have a small size, an IC reader/writer advantageously used for the IC tag and a system using the IC tag.

As the result of intensive studies by the present inventors to achieve the above object, it was found that an IC tag exhibiting the above function which could record and erase information in a non-contact manner, exhibited flexibility and could have a small size could be obtained by forming a printing layer having a specific laminate structure as the means for recording and erasing visible information in the IC tag.

It was also found that an efficient reader/writer which could erase and record information in an IC tag in a non-contact manner using the same apparatus could be obtained by disposing a laser head for recording and erasing visible information and a member for recording and erasing invisible information at different positions in the same apparatus since recording and erasure of visible information in the IC tag could be conducted using laser beam, and the distance from the laser head allowing recording and erasure of visible information to the IC tag and the distance from the member for recording and erasing invisible information allowing recording and erasure of invisible information to the IC tag could be set at values different from each other.

It was further found that a system advantageously used for logistics management could be constructed.

The present invention has been completed based on the above knowledge.

The present invention provides:

(1) An IC tag which comprises a means for recording and erasing invisible information and a means for recording and erasing visible information which are disposed on a surface of a support and allow recording and erasure of the information in a non-contact manner, wherein the means for recording and erasing visible information has a structure such that a layer of a heat sensitive color developing material, a layer of a material absorbing light and converting absorbed light into heat and a protective layer are laminated on the surface of the support successively from the surface, or a layer of a material absorbing light and converting absorbed light into heat, a layer of a heat sensitive color developing material and a protective layer are laminated on the surface of the support successively from the surface;

(2) The IC tag described in (1), wherein the means for recording and erasing invisible information comprises an IC chip and an antenna circuit connected to the IC chip;

(3) The IC tag described in any one of (1) and (2), wherein recording and erasure of visible information are conducted with laser beam having an oscillation wavelength of 700 to 1,500 nm;

(4) A reader/writer for an IC tag which can erase and record information in both of the means for recording and erasing invisible information and the means for recording and erasing visible information in the IC tag described in any one of (1) to (3) using a same apparatus in a non-contact manner;

(5) A system using an IC tag which comprises placing a plurality of objects for control each attached with the IC tag described in any one of (1) to (3) on an automatic machine for transfer, transferring the objects and automatically erasing or recording information in both of the means for recording and erasing invisible information and the means for recording and erasing visible information in each IC tag in a non-contact manner using a reader/writer while the objects are transferred;

(6) The system using an IC tag described in (5), wherein the reader/writer for an IC tag described in (4) is used as the reader/writer;

(7) The system using an IC tag described in any one of (5) and (6), which is applied to logistics management; and (8) The system using an IC tag described in (7), wherein an object of control is a plastic container containing articles transferred by a conveyor.

THE EFFECT OF THE INVENTION

In accordance with the present invention, the IC tag which has a means for recording and erasing invisible information and a means for recording and erasing visible information, both allowing recording and erasing information without contact, exhibits flexibility and can have a small size can be provided. An IC tag can record about several thousands of invisible information expressed as the number of characters while a rewritable thermal label can record about several tens of visible information expressed as the number of characters although the amount depends on the size of the tag. Therefore, in accordance with the present invention, the IC tag having a small size and holding a great amount of information can be provided since the necessary minimum amount of information is recorded as the visible information and other specific information is recorded as the invisible information.

The IC tag exhibiting excellent adhesion to curved surfaces can be obtained since the IC tag is flexible.

The reader/writer which can erase and record information in both of the means for recording and erasing invisible information and the means for recording and erasing visible information in the IC tag in a non-contact manner using the same apparatus and the system using the IC tag which is advantageously applied to logistics management can be provided. Since the means for recording and erasing invisible information and the means for recording and erasing visible information allow recording and erasure of data in a non-contact manner, the system which enables automation of recording and erasure of data can be provided.

Figure 1:
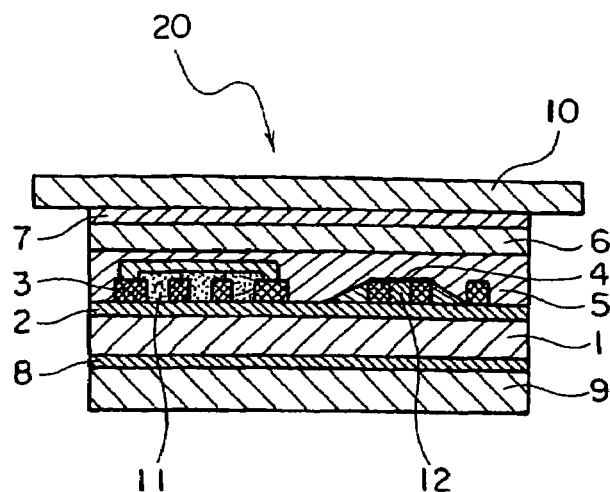
FIG. 1 shows a schematic diagram exhibiting a sectional view of an example of the IC tag of the present invention.

The numbers and characters in the figures have the meanings as listed in the following:

1: Support A
2: An adhesive layer
3: An antenna circuit
4: An IC chip
5, 7 and 8: Adhesive layers
6: Support B
9: A reversible heat sensitive recording material
10: A release sheet
11: An insulation ink
12: An adhesive
20: An RWT-IC tag
21: A conveyor
22: An object of control
24: A reader/writer for an RWT-IC tag
34: A laser head for recording and erasing visible information 35: A member for recording and erasing invisible information 37: A curtain having a reed screen shape

DETAILED DESCRIPTION OF THE INVENTION

The IC tag of the present invention comprises a means for recording and erasing invisible information and a means for recording and erasing visible information which are disposed on the surface of a support and allow recording and erasure of the information in a non-contact manner. The IC tag of the present invention will be occasionally referred to as the RWT-IC tag, hereinafter.

It is necessary that the means for recording and erasing visible information in the RWT-IC tag of the present invention have a printing layer having a structure such that a layer of a heat sensitive color developing material, a layer of a material absorbing light and converting absorbed light into heat and a protective layer are laminated on the surface of the support successively from the surface, or a layer of a material absorbing light and converting absorbed light into heat, a layer of a heat sensitive color developing material and a protective layer are laminated on the surface of the support successively from the surface.

The recording and the erasure of visible information can be achieved by irradiating the printing layer described above with laser beam, for example, having an oscillation wavelength of 700 to 1,500 nm.

As the means for recording and erasing invisible information in the RWT-IC tag of the present invention, a means for recording and erasing information used for conventional IC tags which is constituted with an IC chip and an antenna circuit connected to the IC chip can be used.

FIG. 1 shows a schematic diagram exhibiting a sectional view of an example of the RWT-IC tag of the present invention. In the RWT-IC tag 20, an antenna circuit 3 disposed on one face of support A 1 via an adhesive layer 2 and an IC chip 4 connected to the antenna circuit 3 as the means for recording and erasing invisible information are covered with support B 6 having adhesive layers 5 and 7 at both sides in a manner such that the adhesive layer 5 is placed at the side of the above means, and a release sheet 10 is attached to the adhesive layer 7. The mark 11 means an insulation ink, and the mark 12 means an adhesive for mounting the IC Chip 4.

On the other face of support A 1, a reversible heat sensitive recording material 9 of the non-contact type as the means for recording and erasing visible information is disposed via an adhesive layer 8. A reversible heat sensitive printing layer of the non-contact type may be disposed directly on support A 1 in place of the reversible heat sensitive recording material 9 disposed via the adhesive layer 8.

The reversible heat sensitive recording material of the non-contact type and the reversible heat sensitive printing layer of the non-contact type will be described specifically later.

The process for preparing the RWT-IC tag of the present invention will be described in the following.

As the first step, the formation of the antenna circuit 3 disposed on one face of support A 1 via the adhesive layer 2 and the mounting of the IC chip 4 connected to the antenna circuit 3 on one face of support A 1 to form the means for recording and erasing invisible information can be conducted as follows.

To one face of support A1, a foil of an electrically conductive metal such as a foil of copper or aluminum is attached via the adhesive layer 2. In FIG. 1, the adhesive layer 2 is formed. However, a thin film of an electrically conductive metal such as a thin film of copper or aluminum may be formed by vapor deposition or melt injection of the metal directly on support A 1. Then, an antenna pattern is formed, for example, by etching using the lithography. As another process, support A 1 may be coated with an electrically conductive paste in accordance with the silk screen printing process to form an antenna pattern. The electrically conductive paste comprises metal particles such as silver powder, a resin for adhesion, a plasticizer and a solvent.

After the antenna pattern is formed as described above, an antenna circuit 3 is formed using an insulation ink 11 and the electrically conductive paste, and the IC chip 4 is mounted using an adhesive 12.

Using support B 6 having adhesive layers 5 and 7 and release sheets at both sides, the release sheet at the side of the adhesive layer 5 is removed, and the antenna circuit 3 formed on one face of support A 1 via the adhesive layer 2 and the IC chip 4 mounted on one face of support A 1 and connected to the antenna circuit 3 are covered with support B 6 in a manner such that the adhesive layer 5 is placed at the side of the antenna circuit and the IC chip.

The reversible heat sensitive recording material may be disposed on the other face of support A 1 via an adhesive layer 8 by attaching, for example, a rewritable thermal label of the non-contact type as the means for recording and erasing visible information. The reversible heat sensitive printing layer of the non-contact type may be formed directly on the other face of support A 1.

As the final step, the obtained product is cut into a prescribed size, and the RWT-IC tag of the present invention can be obtained.

In the cutting, the release sheet 10 may have a size greater than that of the RWT-IC tag as shown in FIG. 1 or the same as that of the RWT-IC tag.

The shape of the RWT-IC tag of the present invention is not particularly limited. Examples of the shape include shapes of a label, a card, a coin and a stick. In general, the tag has a shape of a label (a rectangular shape). The size is, in general, about 5 to 100 mm×about 5 to 100 mm although the size is different depending on the application. The thickness is about 100 to 500 μm (excluding the thickness of the release sheet).

The RWT-IC tag of the present invention has characteristics in that flexibility is excellent and the size can be made small when support A 1 and support B 6 are suitably selected from plastic films described below and the thickness is adjusted in the above range.

As support A 1 and support B 6, a suitable support can be selected from conventional plastic films used as the support in conventional IC tags. Examples of the plastic film include polyester films such as films of polyethylene terephthalate, polybutylene terephthalate and polyethylene naphthalate, polyethylene films, polypropylene films, polyvinyl chloride films, polyvinylidene chloride films, polyvinyl alcohol films, ethylene-vinyl acetate copolymer films, polystyrene films, polycarbonate films, polymethylpentene films, polyamide films, acrylic resin films, norbornene-based resin films and cycloolefin resin films.

The thickness of the support is not particularly limited and can be suitably selected. The thickness is, in general, in the range of 10 to 250 μm and preferably in the range of 25 to 100 μm. Where desired, the support may be treated on one or both faces by a surface treatment such as the oxidation treatment or the roughening treatment to improve adhesion with the layer formed on the surface. Examples of the oxidation treatment include the treatment by corona discharge, the treatment with plasma, the treatment with chromic acid (a wet process), the treatment with flame, the treatment with the heated air and the treatment with ozone under irradiation with ultraviolet ray.

Examples of the roughening treatment include the sand blasting and the treatment with a solvent. The surface treatment is suitably selected in accordance with the type of the support. In general, the treatment by corona discharge is preferable from the standpoint of the effect and the operability. One or both faces may be treated with a primer.

The rewritable thermal label of the non-contact type as the means for recording and erasing visible information disposed on the other face of support A 1 will be described in the following.

In the RWT-IC tag of the present invention, the means for recording and erasing visible information has a printing layer having a structure such that a layer of a heat sensitive color developing material, a layer of a material absorbing light and converting absorbed light into heat and a protective layer are laminated on the surface of the support successively from the surface, or a structure such that a layer of a material absorbing light and converting absorbed light into heat, a layer of a heat sensitive color developing material and a protective layer are laminated on the surface of the support successively from the surface. Therefore, as the rewritable thermal label of the non-contact type, a label having the printing layer having the above laminate structure on a substrate is used.

[Rewritable Thermal Label of the Non-contact Type]

A rewritable thermal label having printing layer I having a structure such that a layer of a heat sensitive color developing material, a layer of a material absorbing light and converting absorbed light into heat and a protective layer are laminated on the surface of the support successively from the surface, or printing layer II having a structure such that a layer of a material absorbing light and converting absorbed light into heat, a layer of a heat sensitive color developing material and a protective layer are laminated on the surface of the support successively from the surface, can be used. The rewritable thermal label having printing layer I is preferable. The substrate, the layer of a heat sensitive color developing material and the layer of a material absorbing light and converting absorbed light into heat described above are not particularly limited and can be suitably selected as desired from conventional corresponding substrates and layers. For example, the substrate, the layer of a heat sensitive color developing material and the layer of a material absorbing light and converting absorbed light into heat described in Japanese Patent Application Laid-Open No. 2003-118238 can be used.

In the rewritable thermal label, the protective layer is formed as the outermost layer. In other words, the protective layer is formed on the layer of a material absorbing light and converting absorbed light into heat in printing layer I and on the layer of a heat sensitive color developing material in printing layer II. The protective layer is not particularly limited and can be suitably selected as desired from conventional protective layers used as the protective layer in rewritable thermal labels. For example, protective layers described in Japanese Patent Application Laid-Open No. Heisei 6(1994)-344672 can be used.

In the rewritable thermal label, an adhesive layer may be formed on the face of the substrate opposite to the face having the above layers. As the adhesive constituting the adhesive layer, an acrylic adhesive, a rubber-based adhesive, a polyester-based adhesive or a polyurethane-based adhesive may be used. Among these adhesives, the acrylic adhesive is preferable from the standpoint of weatherability. The thickness of the adhesive layer is, in general, in the range of 5 to 60 µm and preferably in the range of 15 to 40 µm.

In the rewritable thermal label, a release sheet may be disposed on the adhesive layer, where necessary. As the release sheet, a sheet prepared by coating a plastic film such as a film of polyethylene terephthalate (PET), foamed PET and polypropylene, a polyethylene laminate paper, glassine paper or clay coated paper with a releasing agent is used. As the releasing agent, silicone-based releasing agents are preferable. Fluorine-based agents and carbamate-based agents having a long chain alkyl group may also be used. The thickness of the release sheet is not particularly limited. In general, the thickness is about 20 to 150 µm.

The RWT-IC tag of the present invention can be prepared by using the conventional IC tag having the above means for recording and erasing invisible information on one face of a support and attaching the above rewritable thermal label having the means for recording and erasing visible information to the other face of the above support via the adhesive layer after the release sheet is removed.

The RWT-IC tag of the present invention may also be prepared by forming the printing layer by laminating the layer of a heat sensitive color developing material, the layer of a material absorbing light and converting absorbed light into heat and the protective layer or the layer of a material absorbing light and converting absorbed light into heat, the layer of a heat sensitive color developing material and the protective layer directly on the other face of the support or, where desired on an anchor coating layer after the anchor coating layer is formed.

The reader/writer for an IC tag of the present invention will be described in the following.

The reader/writer for an IC tag of the present invention can erase and record information in both of the means for recording and erasing invisible information and the means for recording and erasing visible information in a non-contact manner by the same apparatus.

The recording and erasure of visible information in the RWT-IC tag of the present invention can be conducted using laser beam. As the laser beam, it is preferable from the standpoint of convenience and operability of the apparatus that laser beam having an oscillation wavelength in the range of 700 to 1,500 nm is selected. For example, a semiconductor laser and a YAG laser are preferable. The distance at which information can be recorded can be set as desired in accordance with the used laser. The distance at which information can be recorded and erased can be set at about 100 to 500 mm. It is preferable that the distance at which information can be recorded is 100 to 300 mm, and the distance at which information can be erased is 300 to 500 mm. On the other hand, the distance at which invisible information can be recorded and erased can be set at about 10 to 500 mm by suitably selecting the member for recording and erasing invisible information. Therefore, the mounting of a laser head for recording and erasing visible information and a member for recording and erasing invisible information in the same apparatus can be facilitated by setting the distance between the laser head for recording and erasing visible information and the object of control and the distance between the member for recording and erasing invisible information and the object of control at different values.

In the system using an IC tag of the present invention, a plurality of articles for control each attached with the RWT-IC tag of the present invention are placed on an automatic machine for transfer and transferred. While the objects are transferred, information in both of the means for recording and erasing invisible information and the means for recording and erasing visible information is automatically erased or recorded by the reader/writer in a non-contact manner.

In the system using an IC tag of the present invention, the member for recording and erasing invisible information and the laser head for recording and erasing visible information may be disposed separately on the way of transfer, or the reader/writer for an IC tag of the present invention described above which can achieve the recording and erasure of invisible information and the recording and erasure of visible information by the same apparatus may be disposed on the way of transfer. It is preferable from the standpoint of efficient recording and erasure of information that the reader/writer for an IC tag of the present invention described above is disposed.

Figure 2:
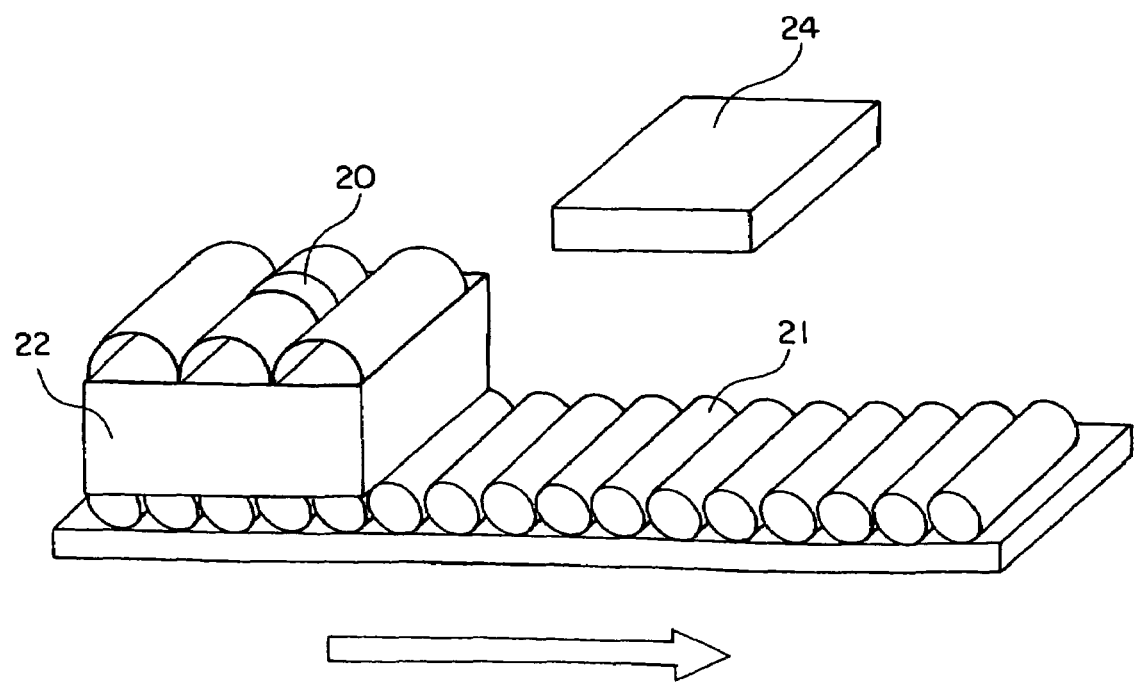
FIG. 2 shows a diagram exhibiting an image diagram of an example of the system using an IC tag of the present invention.

FIG. 2 shows a diagram exhibiting an image diagram of an example of the system using an RWT-IC tag of the present invention.

In the Figure, an object of control 22 having the RWT-IC tag 20 attached on the upper face is placed on a conveyor 21 and transferred in the direction shown by an arrow. When the object of control 22 is transferred to a position under the reader/writer for the RWT-IC tag 24, the conveyor 21 is temporarily stopped, and information is erased or recorded in both of the means for recording and erasing invisible information and the means for recording and erasing visible information in the RWT-IC tag 20 by the reader/writer in a non-contact manner. Thereafter, the movement of the conveyor 21 is resumed, and the object of control 22 is transferred to the designated position. The reader/writer 24 has both of the function of erasing and recording invisible information and the function of erasing and recording visible information in the RWT-IC tag 20.

The system using an IC tag of the present invention can be applied to various managements, such as (a) the control of parts and processes at the place of production, (b) management in the logistics stage (check and control of inventory), (c) management in the sales stage (accounting at the register and simultaneous accounting of a plurality of articles), (d) management at the stage of disposal and recycling, (e) logistics management, (f) management of accounting and lending (automatic accounting at restaurants and control of books in a library), (g) providing information of commercial articles and products (providing information on traceability, information of products and electronic display of posters), (h) safety management and prevention of crime (control of the best-before date, prevention of theft and prevention of shoplifting), (i) finding forgery and identification of name-brand goods, (j) prevention of medical accidents and (k) control of animals. Among these applications, the application to logistics management is preferable.

The system using an IC tag of the present invention is effectively applied to the case where the object of control is a plastic container containing articles transferred by a conveyor in the logistics management.

EXAMPLES

The present invention will be described more specifically with reference to examples in the following. However, the present invention is not limited to the examples.

Example 1

To the surface (at the opposite side of support A 1) of an IC tag of the non-contact type [manufactured by LINTEC Corporation; the trade name: "TS-L102CC"] which was constituted with an IC chip as the means for recording and erasing invisible information and an antenna circuit connected to the IC chip, a rewritable thermal label of the non-contact type [manufactured by LINTEC Corporation; the trade name: "LM082M PA-T1 8LK"] as the means for recording and erasing visible information was attached via an adhesive layer 8 after the release sheet was removed. The obtained laminate was cut into the prescribed shape, and an RWT-IC tag similar to that shown in FIG. 1 was prepared.

The IC tag of the non-contact type which was constituted with an IC chip as the means for recording and erasing invisible information and an antenna circuit connected to the IC chip was prepared in accordance with the following process.

An antenna pattern was formed on a laminate [manufactured by NIKKAN INDUSTRIES Co., Ltd.; the trade name: "NIKAFLEX"] composed of a copper foil and a polyethylene terephthalate film having a thickness of 50 µm (support A 1) by etching. After an insulation ink 11 [manufactured by Acheson (Japan) Ltd.; the trade name: "ML25089"] was applied to spaces between the antenna pattern by printing, an antenna circuit 3 was formed in accordance with the screen printing using a electrically conductive paste [manufactured by TOYOBO CO., LTD.; the trade name: "DW250L-1"], and an IC chip 4 [manufactured by Royal Philips Electronics; "I-CODE"] was mounted with an adhesive 12 [manufactured by KYOCERA Chemical Corporation; the trade name: "TAP0402E"].

Then, the antenna circuit 3 and the IC chip 4 connected to the antenna circuit 3 were covered with a double sided pressure sensitive adhesive tape [manufactured by LINTEC Corporation; the trade name: "TL-85S-50"] having a polyethylene terephthalate film having a thickness of 50 µm as the support (support B 6) in a manner such that an adhesive layer 5 was placed at the side of the antenna circuit and the IC chip, and an IC tag of the non-contact type was prepared.

The rewritable thermal label of the non-contact type as the means for recording and erasing visible information has a structure such that a layer of a heat sensitive color developing material, a layer of a material absorbing light and converting absorbed light into heat and a protective layer were laminated successively on one face of a substrate (a polyethylene terephthalate film having a thickness of 50 µm) and an adhesive layer having a release sheet is disposed on the other face of the substrate.

As the layer of a heat sensitive color developing material, the layer of a material absorbing light and converting absorbed light into heat and the protective layer, the following layers were used.

<Layer of a Heat Sensitive Color Developing Material>

A layer of a heat sensitive color developing material having a thickness of 1.4 µm using 3-(4-diethylamino-2-ethoxyphenyl)-3-(1-ethyl-2-methylindol-3-yl)-4-azaphthalide as the dye precursor, 4-(N-methyl-N-octadecylsulfonylamino)phenol as the reversible color developing agent and a binder of the ultraviolet ray curing type (a urethane acrylate) [manufactured by Dainichiseika Color & Chemicals Mfg. Co., Ltd.; the trade name: "PU-5 (NS)"] as the binder.

<Layer of a Material Absorbing Light and Converting Absorbed Light Into Heat>

A layer of a material absorbing light and converting absorbed light into heat having a thickness of 4 µm using a metal (nickel) complex-based coloring agent [manufactured by TOSCO Co., Ltd.; the trade name: "SDA-5131"] as the material absorbing light, and a binder of the ultraviolet light curing type (a urethane acrylate) [manufactured by Dainichiseika Color & Chemicals Mfg. Co., Ltd.; the trade name: "PU-5 (NS)"] as the binder.

<Protective Layer>

A protective layer having a thickness of 5 µm using a polyurethane polyacrylate [manufactured by ARAKAWA CHEMICAL INDUSTRIES, LTD.; the trade name: "BEAM-SET 500"].

\<Release Sheet\>

A release sheet manufactured by LINTEC Corporation (the trade name: "8LK") prepared by coating a polyethylene laminate paper with a silicone-based releasing agent.

\<Adhesive Layer\>

A layer of an acrylic adhesive having a thickness of 20 μm manufactured by LINTEC Corporation (the trade name: "PA-T1").

The prepared RWT-IC tag had a thickness of 260 μm (excluding the release sheet), a size of 20 mm×55 mm and exhibited excellent flexibility showing no lifting and peeling even when the tag was attached to a curved surface.

The RWT-IC tag was attached to the upper face of a plastic core having a cylindrical shape having a diameter of 150 mm and a length of 500 mm placed at the inside of a plastic container (a size having a length of 550 mm, a width of 500 mm and a height of 100 mm) as the object of control. The object of control was placed on a conveyor, and the following test was conducted using the following reader/writer for an RWT-IC tag.

As the reader/writer for an RWT-IC tag, an apparatus having a YAG laser marker [manufactured by SUNX Limited; the name: "LP-V10"; the oscillation wavelength: 1064 nm] as the laser head for recording and erasing visible information 34 described below and a member for recording and erasing invisible information 35 [manufactured by WELCAT Inc.; a R/W controller: "TE-301-RS"+antenna "AN-102"] described below was used.

The setting was made so that the distance at which information was recorded and erased by the leaser head for recording and erasing visible information 34 was automatically adjusted at a height of 200 mm for the recording and 400 mm for the erasure from the upper face of the plastic core.

The setting was made so that the distance at which information was recorded and erased by the member for recording and erasing invisible information 35 was automatically adjusted at a height of 150 mm from the upper face of the plastic core.

Figure 3:
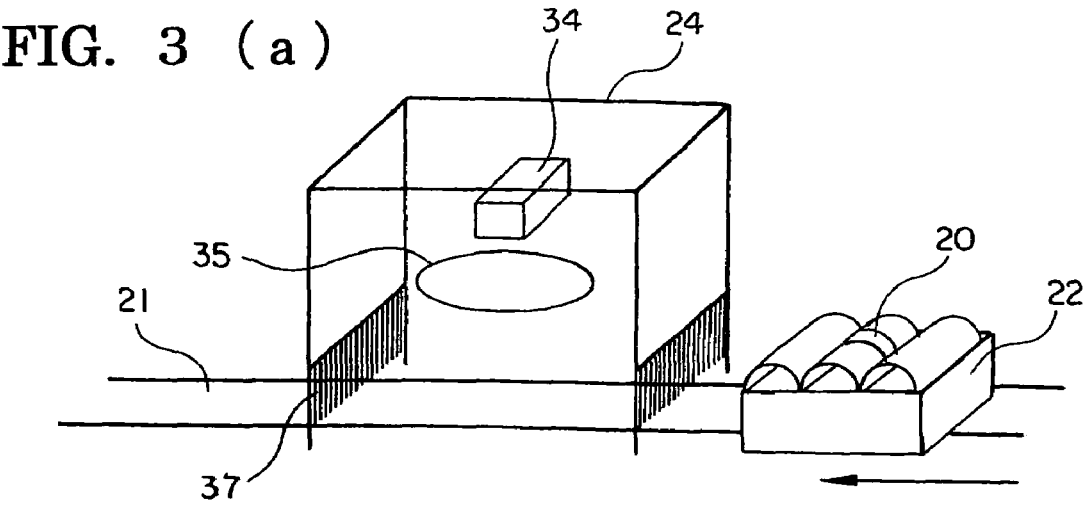
FIGS. 3(a), 3(b) and 3(c) show diagrams exhibiting the test method in the examples.
Figure 3:
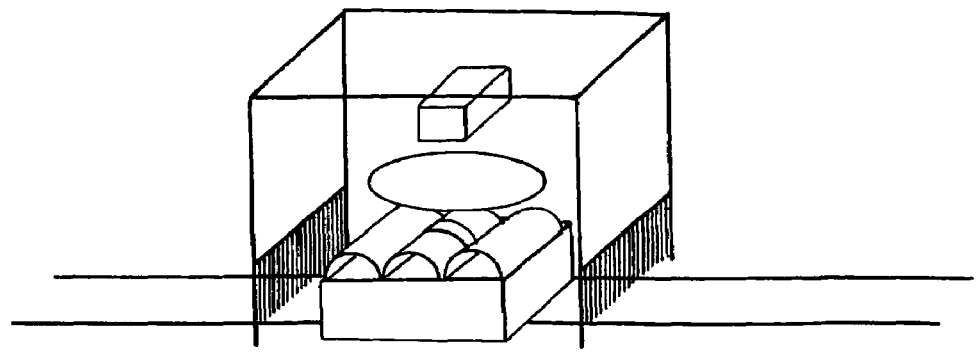
Figure 3:
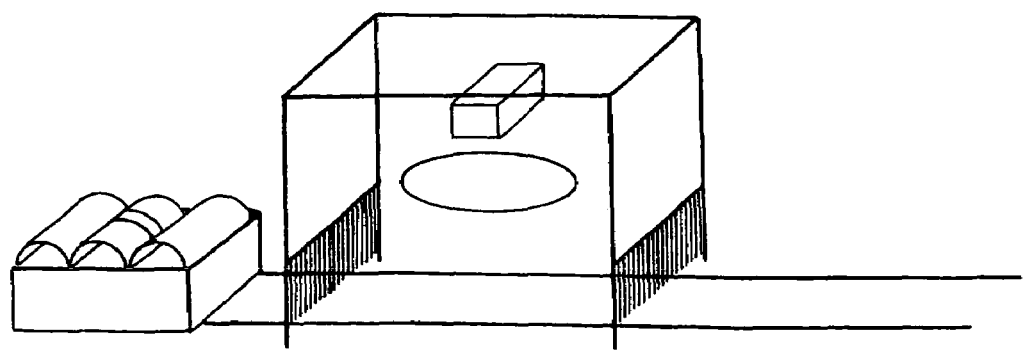

FIGS. 3(*a*), 3(*b*) and 3(*c*) show diagrams exhibiting the test method in the examples.

An object of control 22 attached with the RWT-IC tag 20 on the upper face was placed on a conveyor 21 [FIG. 3(*a*)]. The conveyor 21 was moved, and the object of control 22 was transferred to the inside of the reader/writer for an RWT-IC tag 24. The conveyor 21 was then stopped [FIG. 3(*b*)].

In the reader/writer for an RWT-IC tag 24, a laser head for recording and erasing visible information 34 and a member for recording and erasing invisible information 35 were disposed. At the lower portions of the reader/writer, rubber-based curtains having a reed screen shape 37 through which the object of control 22 was transferred were disposed. A viewing window attached with a resin film cutting off laser beam was disposed at the front face (not shown in the Figure).

In the test, the treatments of the visible information were examined as follows. (1) Recording of visible information, which were the name and the size of the plastic core, and (2) erasure of the visible information recorded in (1) in the rewritable thermal label of the non-contact type in the RWT-IC tag 20 attached to the object of control 22 were conducted by the laser head for recording and erasing visible information 34. It was confirmed by visual observation that (1) the recording and (2) the erasure were surely achieved.

The treatments of the invisible information were examined as follows. (1) Recording of invisible information, which were the name, the size, the lot number and the number of the plastic core, and (2) erasure of the invisible information recorded in (1) in the IC tag of the non-contact type of the RWT-IC tag 20 were conducted by the member for recording and erasing invisible information 35. Information in the IC tag of the non-contact type were recognized by a reader of the handy type [manufactured by WELCAT Inc.; the name: "RHT-100-02"], and it was confirmed that (1) the recording and (2) the erasure were surely achieved.

As the result of the above procedures, it was confirmed that, with respect to both of the visible information and the invisible information, the recording and the erasure of data could be automatically conducted in a non-contact manner using the same apparatus. Thus, the expected results could be obtained.

When the test was completed, the movement of the conveyor 21 was resumed, and the object of control 22 was moved to the outside of the reader/writer for an RWT-IC tag 24 [FIG. 3(*c*)].

Example 2

An RWT-IC tag similar to that prepared in Example 1 was prepared in accordance with the same procedures as those conducted in Example 1 except that, in the rewritable thermal label of the non-contact type, the layer of a material absorbing light and converting absorbed light into heat, the layer of a heat sensitive color developing material and the protective layer were successively laminated on one face of the substrate.

The same tests as those conducted in Example 1 were conducted, and the same results as those obtained in Example 1 were obtained in all tests.

INDUSTRIAL APPLICABILITY

The IC tag of the present invention has a means for recording and erasing visible information and a means for recording and erasing invisible information, both allowing recording and erasing information in a non-contact manner, exhibits flexibility and can have a small size. The system using the RWT-IC tag can be advantageously used, for example, for logistics management.

What is claimed is:

1. An integrated circuit (IC) tag which comprises a means for recording and erasing invisible information and a means for recording and erasing visible information which are disposed on a surface of a support and allow recording and erasure of the information in a non-contact manner, wherein the means for recording and erasing visible information have a printing layer having a structure such that a layer of a heat sensitive color developing material, a layer of a material absorbing light and converting absorbed light into heat and a protective layer are laminated on the surface of the support successively from the surface, or a layer of a material absorbing light and converting absorbed light into heat, a layer of a heat sensitive color developing material and a protective layer are laminated on the surface of the support successively from the surface wherein the means for recording and erasure of visible information is suitable for recording and erasure of visible information with a laser beam having an oscillation wavelength of 700 to 1,500 nm, and said IC tag has a shape of a label and has a structure such that:

(a) a first adhesive layer, a first support, a second adhesive layer, an antenna circuit formed on one face of a second support via a third adhesive layer and is connected to an IC chip disposed on the face of the second support via the third adhesive layer, a fourth adhesive layer and a reversible heat sensitive recording material as the means for recording and erasing visible information are laminated in an order presented above, or (b) a first adhesive layer, a first support, a second adhesive layer, an antenna circuit formed on one face of a second support via a third adhesive layer and is connected to an IC chip disposed on the face of the second support via the third adhesive layer, and a reversible heat sensitive recording material as the means for recording and erasing visible information are laminated in an order presented above.

2. The IC tag according to claim 1, wherein the thickness of the support is 25 to 100 μm.

3. A reader/writer for an integrated circuit (IC) tag which erases and records information in both of the means for recording and erasing invisible information and the means for recording and erasing visible information in the IC tag using a same apparatus in a non-contact manner, wherein said IC tag comprises a means for recording and erasing invisible information and a means for recording and erasing visible information which are disposed on a surface of a support and allow recording and erasure of the information in a non-contact manner, wherein the means for recording and erasing visible information have a printing layer having a structure such that a layer of a heat sensitive color developing material, a layer of a material absorbing light and converting absorbed light into heat and a protective layer are laminated on the surface of the support successively from the surface, or a layer of a material absorbing light and converting absorbed light into heat, a layer of a heat sensitive color developing material and a protective layer are laminated on the surface of the support successively from the surface and the recording and the erasing visible information is achieved by irradiating said printing layer with laser beam, wherein a distance at which visible information is recorded and erased is set at about 100 to 500 mm and a distance at which invisible information is recorded and erased is set at about 10 to 500 mm, thereby a mounting of a laser head for recording and erasing visible information and a member for recording and erasing invisible information in the same apparatus is facilitated by setting a distance between the laser head for recording and erasing visible information and an object of control and a distance between the member for recording and erasing invisible information and the object of control at different values.

4. A system comprising an integrated circuit (IC) tag, said system comprises placing a plurality of objects for control each attached with the IC tag on an automatic machine for transfer, transferring the objects and automatically erasing or recording information in both of the means for recording and erasing invisible information and the means for recording and erasing visible information in each IC tag in a non-contact manner using a reader/writer as defined in claim 3 while the objects are transferred, wherein said IC tag comprises a means for recording and erasing invisible information and a means for recording and erasing visible information which are disposed on a surface of a support and allow recording and erasure of the information in a non-contact manner, wherein the means for recording and erasing visible information have a printing layer having a structure such that a layer of a heat sensitive color developing material, a layer of a material absorbing light and converting absorbed light into heat and a protective layer are laminated on the surface of the support successively from the surface, or a layer of a material absorbing light and converting absorbed light into heat, a layer of a heat sensitive color developing material and a protective layer are laminated on the surface of the support successively from the surface and the recording and the erasing visible information is achieved by irradiating said printing layer with laser beam.

5. The system according to claim 4, wherein the objects of control are plastic containers containing articles transferred by a conveyor in logistics management.

6. The system according to claim 4 wherein the reader/writer is a reader/writer for an IC tag which erases and records information in both of the means for recording and erasing invisible information and the means for recording and erasing visible information in said IC tag using a same apparatus in a non-contact manner.

7. The system according to claim 6, wherein the reader/writer is a reader/writer in which a distance at which visible information is recorded and erased is set at about 100 to 500 mm and a distance at which invisible information is recorded and erased is set at about 10 to 500 mm, thereby a mounting of a laser head for recording and erasing visible information and a member for recording and erasing invisible information in the same apparatus is facilitated by setting a distance between the laser head for recording and erasing visible information and an object of control and a distance between the member for recording and erasing invisible information and the object of control at different values.

8. The system according to claim 4, wherein the means for recording and erasure of visible information is suitable for recording and erasure of visible information with a laser beam having an oscillation wavelength of 700 to 1,500 nm, and said IC tag has a shape of a label and has a structure such that:

(a) a first adhesive layer, a first support, a second adhesive layer, an antenna circuit formed on one face of a second support via a third adhesive layer and is connected to an IC chip disposed on the face of the second support via the third adhesive layer, a fourth adhesive layer and a reversible heat sensitive recording material as the means for recording and erasing visible information are laminated in an order presented above, or (b) a first adhesive layer, a first support, a second adhesive layer, an antenna circuit formed on one face of a second support via a third adhesive layer and is connected to an IC chip disposed on the face of the second support via the third adhesive layer, and a reversible heat sensitive recording material as the means for recording and erasing visible information are laminated in an order presented above.

* * * * *